(12) United States Patent
Li et al.

(10) Patent No.: US 10,678,089 B2
(45) Date of Patent: Jun. 9, 2020

(54) LIQUID CRYSTAL LENS, MANUFACTURING METHOD THEREOF, AND DISPLAY DEVICE

(71) Applicant: BOE TECHNOLOGY GROUP CO., LTD., Beijing (CN)

(72) Inventors: Zhongxiao Li, Beijing (CN); Wenqing Zhao, Beijing (CN); Ming Yang, Beijing (CN); Qian Wang, Beijing (CN); Haiyan Wang, Beijing (CN); Xiaochen Niu, Beijing (CN); Can Wang, Beijing (CN); Dacheng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/079,716

(22) PCT Filed: Dec. 19, 2017

(86) PCT No.: PCT/CN2017/117196
§ 371 (c)(1),
(2) Date: Aug. 24, 2018

(87) PCT Pub. No.: WO2018/157650
PCT Pub. Date: Sep. 7, 2018

(65) Prior Publication Data
US 2019/0278131 A1    Sep. 12, 2019

(30) Foreign Application Priority Data

Feb. 28, 2017  (CN) .......................... 2017 1 0112895

(51) Int. Cl.
*G02F 1/1335*    (2006.01)
*G02B 26/00*    (2006.01)
(Continued)

(52) U.S. Cl.
CPC ..... *G02F 1/133526* (2013.01); *G02B 26/005* (2013.01); *G02B 30/00* (2020.01);
(Continued)

(58) Field of Classification Search
CPC ..... G02F 1/133526; G02F 2001/13415; G02B 26/005; G02B 2207/115; G02B 27/22;
(Continued)

(56) References Cited

U.S. PATENT DOCUMENTS 8,355,209 B2    1/2013  Tsuji et al.
2014/0016080 A1  1/2014  Chen et al.
(Continued)

FOREIGN PATENT DOCUMENTS

CN    103926704 A    7/2014
CN    104950544 A    9/2015
(Continued)

OTHER PUBLICATIONS

Berge, B. "Liquid Lens Technology: Principle of Electrowetting Based Lenses and Applications to Imaging," Conference Paper in Proceedings of the IEEE International Conference on MEMS Jan. 2005; pp. 227-230; paper uploaded by B. Berge on May 26, 2014. (Year: 2014).*
(Continued)

*Primary Examiner* — Angela K Davison
(74) *Attorney, Agent, or Firm* — Dilworth & Barrese, LLP.; Michael J. Musella, Esq.

(57) ABSTRACT

A liquid crystal lens, a manufacturing method thereof, and a display device are disclosed. The liquid crystal lens includes a liquid layer located between a first substrate and a second substrate, the liquid layer includes a liquid crystal layer and a filler layer, the filler layer is filled in a square between the
(Continued)

first substrate and the second substrate except the liquid crystal layer; the liquid crystal layer is made of a material different from the filler layer.

16 Claims, 10 Drawing Sheets

(51) Int. Cl.
| | | |
|---|---|---|
| *G02B 27/09* | (2006.01) | |
| *G02F 1/13* | (2006.01) | |
| *G02F 1/29* | (2006.01) | |
| *G02B 30/00* | (2020.01) | |
| *G02B 30/27* | (2020.01) | |
| *G02F 1/133* | (2006.01) | |

(52) U.S. Cl.
CPC ............... *G02B 30/27* (2020.01); *G02F 1/13* (2013.01); *G02F 1/29* (2013.01); *G02B 27/0955* (2013.01); *G02B 27/0961* (2013.01); *G02B 27/0966* (2013.01); *G02B 2207/115* (2013.01); *G02F 1/13306* (2013.01)

(58) Field of Classification Search
CPC .. G02B 27/2214; G02C 7/085; H04N 13/302; H04N 13/322
See application file for complete search history.

(56) References Cited

U.S. PATENT DOCUMENTS

| | | | |
|---|---|---|---|
| 2014/0049706 A1* | 2/2014 | Park | G02B 27/22 349/15 |
| 2014/0362313 A1 | 12/2014 | Xie et al. | |
| 2017/0014732 A1* | 1/2017 | Tsukane | B01D 11/0446 |
| 2018/0101054 A1* | 4/2018 | Zha | G02F 1/133526 |
| 2018/0217378 A1 | 8/2018 | Wang et al. | |

FOREIGN PATENT DOCUMENTS

| | | |
|---|---|---|
| CN | 105866956 A | 8/2016 |
| CN | 106353928 A | 1/2017 |
| TW | 201403178 A | 1/2014 |

OTHER PUBLICATIONS

Shamai, Romi et. al. "Water, Electricity, and between . . . On Electrowetting and its Applications," Soft Matter Journal of The Royal Society of Chemistry, pp. 38-45, Nov. 14, 2007. (Year: 2007).*

Cheng, Chih-Cheng et. al., "Variable Focus Dielectric Liquid Droplet Lens," Optics Express, vol. 14, No. 9; May 1, 2006. (Year: 2006).*

International Search Report and Written Opinion dated Mar. 15, 2018 from State Intellectual Property Office of the P.R. China.

* cited by examiner

LIQUID CRYSTAL LENS, MANUFACTURING METHOD THEREOF, AND DISPLAY DEVICE

CROSS-REFERENCE TO RELATED APPLICATION

The present application claims priority of China Patent Application No. 201710112895.1 filed on Feb. 28, 2017, the content of which is incorporated in its entirety as part of the present application by reference herein.

TECHNICAL FIELD

At least one embodiment of the present disclosure relates to a liquid crystal lens, a manufacturing method thereof, and a display device.

BACKGROUND

Liquid crystal lenses have excellent performance, can be used for electrical focusing, are widely used in focusing devices and human eye amplification devices, and especially make great contribution to the area of 3D display. The application of liquid crystal lenses can get rid of the constraint of 3D glasses on human eyes, so that naked eye 3D display can be achieved; therefore, the liquid crystal lenses have a huge application prospect.

SUMMARY

At least one embodiment of the present disclosure provides a liquid crystal lens, comprising: a first substrate, a second substrate and a liquid layer located between the first substrate and the second substrate, wherein the liquid layer comprises a liquid crystal layer and a filler layer, the liquid crystal layer comprises a plurality of liquid crystal lens units, the plurality of liquid crystal lens units are located on the first substrate, the filler layer is filled in a space between the first substrate and the second substrate except the liquid crystal layer; and the liquid crystal layer is made of a material different from the filler layer.

For example, the liquid crystal lens further comprises a first electrode and a second electrode, the first electrode and the second electrode are configured to form an electric filed to drive liquid crystal molecules of the liquid crystal layer to rotate, and the first electrode and the second electrode are further configured to adjust a curvature of each of the liquid crystal lens units.

For example, an interval is provided between two adjacent liquid crystal lens units, the interval is filled with the filler layer.

For example, the liquid layer is configured to adjust a dimension of the interval between the two adjacent liquid crystal lens units under an action of the electric field.

For example, an arch height of each of the liquid crystal lens units is less than a cell thickness of the liquid crystal lens.

For example, the liquid crystal layer has a same density as the filler layer.

For example, a filler liquid of the filler layer comprises a saline solution.

For example, the first electrode is located on the first substrate, and the second electrode is located on the second substrate.

For example, the first electrode comprises a plurality of electrode strips, the plurality of electrode strips are arranged in parallel, the plurality of liquid crystal lens units are arranged in parallel, each of the plurality of electrode strips has a same extension direction as each of the liquid crystal lens units.

For example, each of the electrode strips is located at an adjacent position of two adjacent liquid crystal lens units, in a direction perpendicular to the first substrate, an orthographic projection of each of the electrode strips on the first substrate has an overlapped portion with an orthographic projection of two adjacent liquid crystal lens units corresponding to the electrode strip on the first substrate.

For example, the liquid crystal lens further comprises a hydrophobic layer, wherein the hydrophobic layer is located between the liquid layer and the first substrate, at least the liquid crystal layer in the liquid layer is in contact with the hydrophobic layer.

For example, each of the liquid crystal lens units is configured to have a curvature to be increased upon forming an electric field between the first electrode and the second electrode.

For example, the liquid crystal layer comprises a negative liquid crystal material, liquid crystal molecules in the liquid crystal layer are vertically aligned with a pre-tilt of 90 degrees in a case where no electric filed is formed.

For example, relative to a case where no electric field is formed between the first electrode and the second electrode, a refractive index of the liquid crystal layer is increased upon forming an electric field between the first electrode and the second electrode.

At least one embodiment of the present disclosure further provide a manufacturing method of a liquid crystal lens, comprising:

forming a liquid crystal layer on the first substrate;
forming a filler layer on the liquid crystal layer; and
cell-assembling the first substrate and the second substrate, wherein the liquid crystal layer comprises a plurality of liquid crystal lens units, the plurality of liquid crystal lens units are in contact with the first substrate, the filler layer is filled in a space between the first substrate and the second substrate except the liquid crystal layer; and the liquid crystal layer is made of a material different from the filler layer.

For example, the manufacturing method further comprises: forming a first electrode on the first substrate; and forming a second electrode on the first substrate or the second substrate; wherein the first electrode and the second electrode are configured to form an electric field to drive liquid crystal molecules of the liquid crystal layer to rotate, and the first electrode and the second electrode are further configured to adjust a curvature of each of the liquid crystal lens units.

For example, the liquid crystal layer is formed by a dropping method.

For example, forming the liquid crystal layer by the dropping method comprises:

upon dropping liquid crystal droplets, forming each of the liquid crystal lens units with a strip shaped and having an arch shape by merging adjacent liquid crystal droplets in a first direction together due to a small interval provided between the adjacent liquid crystal droplets in the first direction; forming the plurality of the liquid crystal lens units arranged in a sequence by keeping adjacent liquid crystal droplets in a second direction not in contact with each other and independent from each other due to a large interval provided between the adjacent liquid crystal droplets in the second direction; the first direction being perpendicular to the second direction.

For example, the manufacturing method further comprises: forming an insulation layer on the first substrate, and forming a hydrophobic layer on the insulation layer, wherein at least the liquid crystal layer in the filler layer and the liquid crystal layer is in contact with the hydrophobic layer.

At least one embodiment of the present disclosure provides a display device, comprising the above-mentioned liquid crystal lens.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
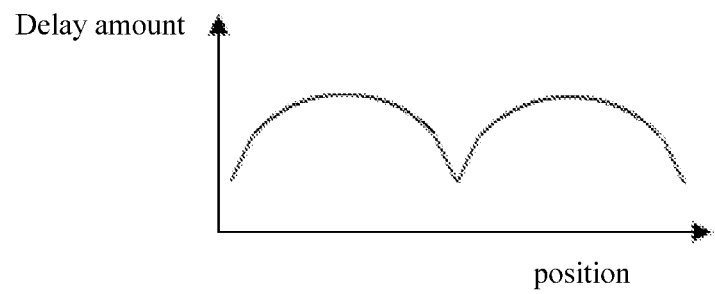
FIG. 1 is a schematic diagram of an optical delay curve of a liquid crystal lens.

A liquid crystal lens is mostly used to replace a convex lens, and different focal lengths can be achieved by utilizing different rotation degrees of liquid crystal molecules. However, the conventional liquid crystal lens can only replace a single lens, and has a narrow adjustable range of a focal length. The conventional liquid crystal lens has a complicated implementation method, and requires multiple electrodes to be applied with different specific signals to achieve a required equivalent result of a lens and achieve a required optical delay curve. In a case where a conventional liquid crystal lens is applied to a lens-type naked-eye 3D display, a profile of a delay curve corresponding to a position where the electrode strips of adjacent lenses are located is relatively poor, resulting in a relatively large crosstalk, affecting the 3D effect, and restricting some applications of the liquid crystal lens. The delay curve can be illustrated in FIG. 1, curvature radius is different at different positions, and the optical delay curve is not smooth. For example, the amount of delay can be an optical path difference.

At least one embodiment of the present disclosure relates to a liquid crystal lens, a manufacturing method thereof, and a display device, which can increase an adjustable range of a focal length of the liquid crystal lens.

Figure 2A:
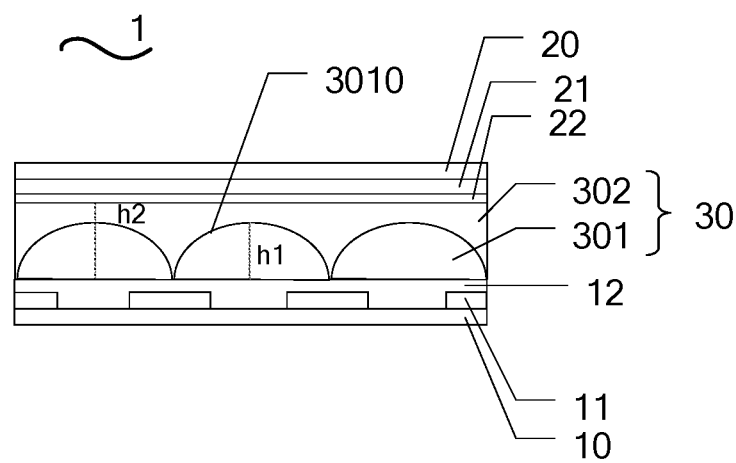
FIG. 2A is, a cross-sectional view of a liquid crystal lens provided by an embodiment of the present disclosure.

At least one embodiment of the present disclosure provides a liquid crystal lens 1, as illustrated in FIG. 2A, for example, the liquid crystal lens 1 includes a first substrate 10, a second substrate 20, and a liquid layer 30 located between the first substrate 10 and the second substrate 20. The liquid layer 30 includes a liquid crystal layer 301 and a filler layer 302. The liquid crystal layer 301 includes a plurality of liquid crystal lens units 3010. The plurality of liquid crystal lens units 3010 are located on the first substrate 10 and are in contact with the first substrate 10. The filler layer 302 is filled in a space between the first substrate 10 and the second substrate 20 except the liquid crystal layer 301. The liquid crystal layer 301 is made of a material different from the filler layer 302.

For example, as illustrated in FIG. 2A, the liquid crystal lens 1 further includes a first electrode 11 and a second electrode 21, the first electrode 11 and the second electrode 21 are configured to form an electric field to drive liquid crystal molecules of the liquid crystal layer 301 to rotate, and the first electrode 11 and the second electrode 21 are further configured to adjust a curvature of each of the liquid crystal lens units 3010. For example, when no electric field is formed between the first electrode 11 and the second electrode 21, each of the liquid crystal lens units 3010 has the same curvature radius at different positions. For example, upon forming an electric field between the first electrode 11 and the second electrode 21, each of the liquid crystal lens units 3010 has the same curvature radius at different positions. For example, that each of the liquid crystal lens units 3010 has the same curvature radius at different positions refers to that each of the liquid crystal lens unit 3010 is a part of a sphere. That is to say, an interface of each of the liquid crystal lens unit away from the first substrate is a part of a sphere surface. Each of the liquid crystal lens unit 3010 has different curvature radiuses in cases that an electric field is formed between the first electrode 11 and the second electrode 21 or not. Upon forming an electric field between the first electrode 11 and the second electrode 21, the curvature of each of the liquid crystal lens unit 3010 is increased. For example, a vertical electric field or an electric field having a vertical component can be formed between the first electrode 11 and the second electrode 21. The vertical electric field or the vertical component of the electric field can facilitate formation of an electrowetting effect.

Figure 2B:
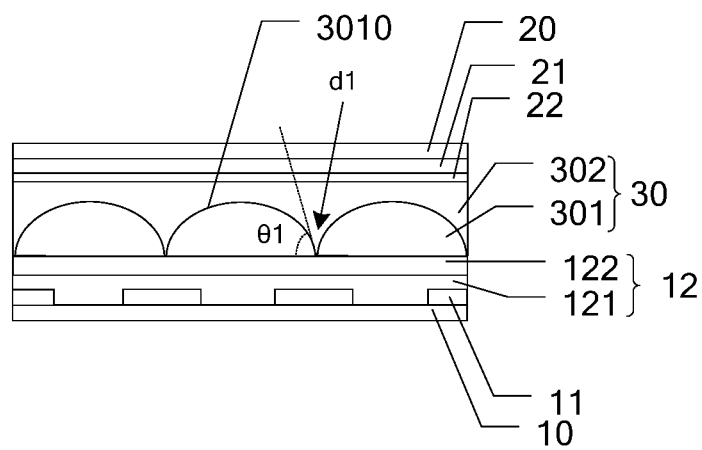
FIG. 2B is a cross-sectional view of a liquid crystal lens provided by another embodiment of the present disclosure.
Figure 2C:
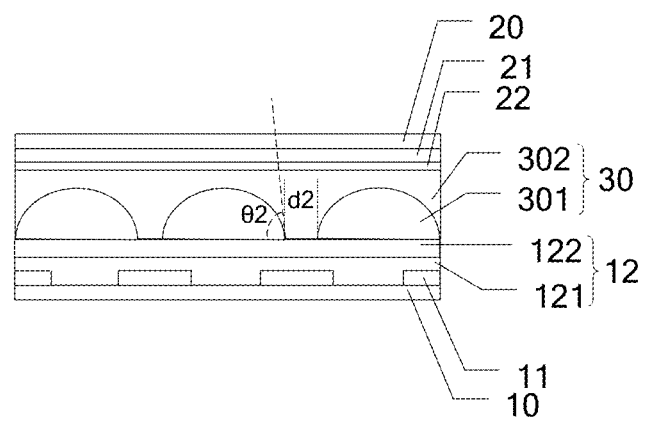
FIG. 2C is a schematic view of the liquid crystal lens provided in FIG. 2B after an electric field is formed between the first electrode and the second electrode.

According to the liquid crystal lens provided by at least one embodiment of the present disclosure, in one aspect, a refractive index of the liquid crystal layer 301 is changed after the first electrode 11 and the second electrode 21 are loaded with driving signals respectively to form an electric field therebetween, and thus focal lengths of the liquid crystal lens units 3010 can be adjusted. In another aspect, free energy of the solid-liquid interface is decreased after the first electrode 11 and the second electrode 21 are loaded with driving signals respectively to form an electric field therebetween. For example, the filler layer 302 is hydrophilic. For example, in the comparison of the filler layer 302 and the liquid crystal layer 301, the hydrophilicity of the filler layer 302 is stronger than the hydrophilicity of the liquid crystal layer 301. As illustrated in FIGS. 2B and 2C, after an electric field is formed between the first electrode 11 and the second electrode 21, the liquid crystal lens units 3010 are pushed by the filler layer 302 with strong hydrophilicity, and the filler layer 302 tends to occupy more components in contact area of the first substrate 11 and the liquid layer 30, a distance between adjacent liquid crystal lens units 3010 is increased (increased from d1 to d2), a contact angle of the liquid crystal lens unit 3010 is increased (increased from θ1 to θ2), and an increased space between the adjacent liquid crystal lens units 3010 is filled with the filler layer 302. Because the shape of each of the liquid crystal lens units 3010 is changed, while a volume of each of the liquid crystal lens units 3010 does not change, the focal length of each of the liquid crystal lens units 3010 can be further adjusted. That is, the adjustable range of the focal length of the liquid crystal lens can be increased. The liquid crystal lens provided by at least one embodiment of the present disclosure can replace a conventional lens to achieve optical path conversion and have a focal length to be adjusted in a wide range. At the same time, the delay curve is relatively smooth and the curvature radiuses are approximately the same at different positions of the liquid crystal lens unit.

According to the liquid crystal lens provided by an embodiment of the present disclosure, for example, as illustrated in FIG. 2A, the first electrode 11 is located on the first substrate 10, the second electrode 21 is located on the second substrate 20. For example, a first planarization layer 12 may be located on the first substrate 10, and the first electrode 11 and the first planarization layer 12 may be sequentially located on the first substrate 10. For example, a second planarization layer 22 may be located on the second substrate 20, and the second electrode 21 and the second planarization layer 22 may be sequentially located on the second substrate 20. The second electrode 21 may also be located on the first substrate 10, as long as the electric field formed between the first electrode 11 and the second electrode 21 can drive the liquid crystal molecules of the liquid crystal layer 301 to rotate. Embodiments of the present disclosure are not limited thereto. For example, the first electrode 11 and the second electrode 21 may use a metal material or a transparent conductive material such as a transparent conductive oxide material (e.g., indium tin oxide).

For example, the first planarization layer 12 and the second planarization layer 22 may adopt an insulation material. In order to obtain a better electrowetting effect, the first planarization layer 12 and the second planarization layer 22 may also have hydrophobic performance, i.e., be made of a hydrophobic material. For example, a material of the first planarization layer 12 and the second planarization layer 22 includes polyimide. The first planarization layer 12 may further include an alignment film. The alignment film is located on a side close to the liquid layer and is in contact with the liquid layer to facilitate alignment of the liquid crystal molecules, so as to form a pre-tilt angle. For example, the liquid crystal molecules can be vertically aligned, i.e., an initial pre-tilt angle is 90 degrees or approximately 90 degrees. The formation of the initial pre-tilt angle is not limited to the method of adopting an alignment film, and other methods may be used. For example, the liquid crystal material may be added with a material which allows the liquid crystal layer to reach a predetermined pre-tilt angle under a light irradiation condition.

According to the liquid crystal lens provided by an embodiment of the present disclosure, as illustrated in FIG. 2A, for example, in order to prevent the liquid crystal lens units 3010 from contacting a layer of the second substrate 20 close to the first substrate 10 in cases that no electric filed or an electric field is formed between the first electrode 11 and the second electrode 21, an arch height h1 of each of the liquid crystal lens units 3010 is less than a cell thickness h2 of the liquid crystal lens. For example, in order to achieve a better lens effect, the arch height h1 of the liquid crystal lens unit 3010 can be set as 80-90% of the cell thickness h2 of the liquid crystal lens. For example, the arch height h1 of the liquid crystal lens unit 3010 refers to a distance between the vertex of the liquid crystal lens unit 3010 and a surface of the liquid crystal lens unit 3010 which is in contact with the first substrate 10. For example, the vertex of the liquid crystal lens unit 3010 refers to a point where the distance between the liquid crystal lens unit 3010 and the contact surface of the liquid crystal lens unit 3010 and the first substrate 10 is the largest. For example, the cell thickness h2 refers to a distance between a layer of the first substrate 10 close to the second substrate 20 and a layer of the second substrate 20 close to the first substrate 10. Further, the cell thickness h2 refers to, for example, a distance between the first planarization layer 12 and the second planarization layer 22.

According to the liquid crystal lens provided by an embodiment of the present disclosure, in order to prevent liquid in the liquid layer 30 from being moved by gravity, the liquid crystal layer 301 has a same a density as the filler layer 302.

According to the liquid crystal lens provided by an embodiment of the present disclosure, a filler liquid of the filler layer 302 includes a saline solution. For example, the density of the filler liquid in the filler layer 302 can be the same as the density of the liquid crystal lens unit 3010 by changing the amount of salt dissolved in the saline solution, so that there is no risk of the liquid crystal layer being forced to flow, which is advantageous for maintaining the shape of the liquid crystal lens units 3010. It should be noted that the filler liquid of the filler layer 302 is not limited to saline solution.

According to the liquid crystal lens provided by an embodiment of the present disclosure, for example, as illustrated in FIG. 2B, the first planarization layer 12 of the liquid crystal lens includes an insulation layer 121 and a hydrophobic layer 122. The insulation layer 121 can be served as a dielectric layer, the insulation layer 121 is located on the first electrode 11, and the hydrophobic layer 122 is located on the insulation layer 121. At least the liquid crystal layer 301 in the liquid layer 30 is in contact with the hydrophobic layer 122. For example, as illustrated in FIG. 2B, the liquid crystal lens unit 3010 has an arch shape, which is naturally formed by a liquid droplet and a hydrophobic material, and a contact angle of the liquid crystal lens unit 3010 is related to tension forces of the materials. For example, the hydrophobic layer 122 can also be served as an alignment film at the same time, and has a function of aligning the liquid crystal molecules.

Figure 3A:
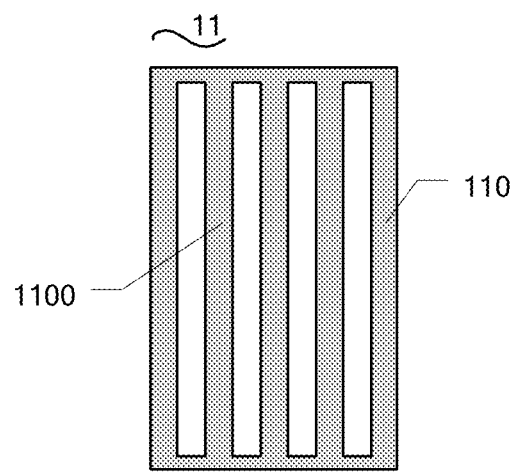
FIG. 3A is a top view of a first electrode in a liquid crystal lens provided by an embodiment of the present disclosure.

According to the liquid crystal lens provided by an embodiment of the present disclosure, as illustrated in FIG. 3A, for example, the first electrode 11 includes a plurality of electrode strips 110, and the plurality of electrode strips 110 are arranged in parallel. Compared with a common liquid crystal lens in which a plurality of electrode strips are applied with different specific signals to achieve a required lens equivalent result, in the liquid crystal lens provided by the embodiment of the present disclosure, the electrode strips only require to be applied with the same signal, the adjustment of focal length of the liquid crystal lens can be achieved by changing a value of the signal voltage; therefore, the number of electrode strips needed to achieve a liquid crystal lens effect is reduced. For example, as illustrated in FIG. 3A, the plurality of electrode strips 110 can be electrically connected together in order to facilitate the application of the same signal. For example, a driving signal can be applied to the first electrode 11, and the driving signal can be a square wave signal with the same positive and negative values. For example, a square wave signal with the same positive and negative values of 60 Hz can be applied to the first electrode 11, and the second electrode 21 can be a common electrode which can be applied with a DC signal with zero voltage (0V). For example, the second electrode 21 may have a plate shape.

Figure 3B:
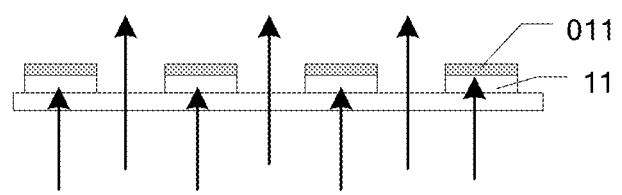
FIG. 3B is a sectional view of a first electrode in a liquid crystal lens provided by an embodiment of the present disclosure.

According to the liquid crystal lens provided by an embodiment of the present disclosure, for example, as illustrated in FIG. 3B, a light shielding layer 011 may be further located on the first electrode 11. The light shielding layer 011 is configured to shield light, and the light shielding layer 011 can be a surface blacken layer of a metal electrode or have the same material with a black matrix. In the case where the liquid crystal lens provided by the present embodiment is applied to 3D display, backlight cannot pass through a position where the first electrode is located, and no light passes through adjacent positions of the liquid crystal lens unit, which can reduce light crosstalk between adjacent positions of the liquid crystal lens units, thereby reducing a crosstalk value of a 3D display device. For example, the first electrode 11 may adopt an opaque material, for example, a metal material. In the case where the first electrode 11 is made of a metal material, a similar effect for shielding light can also be achieved; therefore, the light shielding layer 011 can be omitted.

Figure 4A:
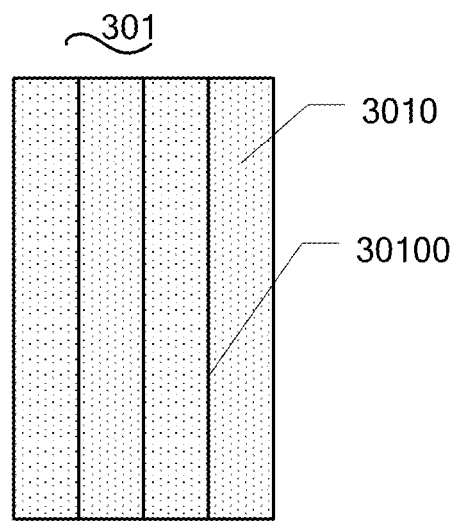
FIG. 4A is a top view of liquid crystal lens units of a liquid crystal layer in a liquid crystal lens provided by an embodiment of the present disclosure.
Figure 4B:
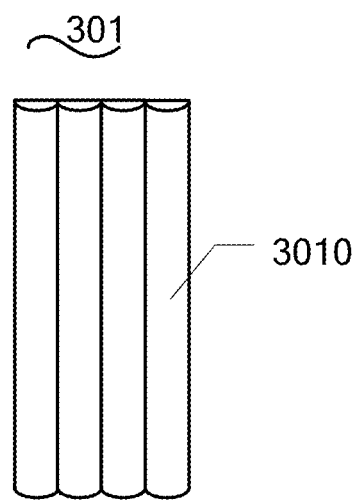
FIG. 4B is a schematic perspective view of liquid crystal lens units of a liquid crystal layer in a liquid crystal lens provided by an embodiment of the present disclosure.

According to the liquid crystal lens provided by an embodiment of the present disclosure, as illustrated in FIG. 4A, for example, the plurality of liquid crystal lens units 3010 are arranged in parallel. For example, two adjacent liquid crystal lens units 3010 are adjacent to each other at an adjacent position 30100. For example, two adjacent liquid crystal lens units 3010 may be in contact with each other at the adjacent position 30100. For example, as illustrated in FIGS. 3A and 4A, the electrode strip 110 has the same extension direction as the liquid crystal lens unit 3010.

Figure 4C:
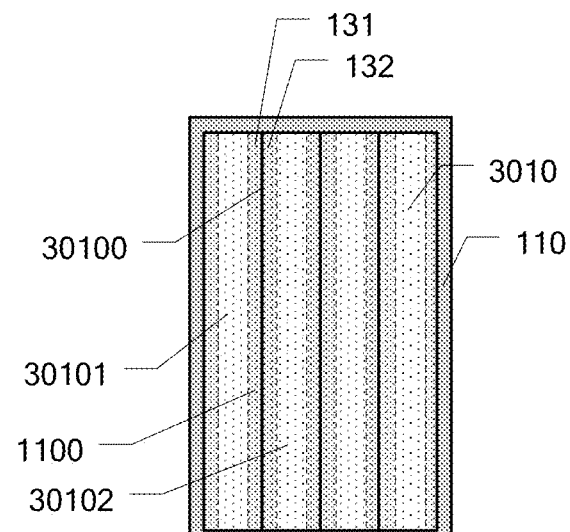
FIG. 4C is a top view of a first electrode and liquid crystal lens units of a liquid crystal layer in a liquid crystal lens provided by an embodiment of the present disclosure

FIG. 4C illustrates a top view of liquid crystal lens units 3010 and electrode strips 110. For clarity, the liquid crystal lens units 3010 is illustrated as being semi-transparent.

According to the liquid crystal lens provided by an embodiment of the present disclosure, for example, as illustrated in FIG. 4C, each of the electrode strips 110 is located at an adjacent position 30100 of two adjacent liquid crystal lens units 3010 corresponding to the electrode strip 110, and each of the electrode strips 110 and two adjacent liquid crystal lens units 3010 corresponding to the electrode strip 110 are partially overlapped with each other in a direction perpendicular to the first substrate 10. That is, an orthographic projection of each of the electrode strips 110 on the first substrate 10 has an overlapped portion with an orthographic projection of two adjacent liquid crystal lens units 3010 corresponding to the electrode strip 110 on the first substrate 10. Therefore, a better electrowetting effect can be obtained by applying a voltage to an adjacent position (for example, an interface contact position) of two adjacent liquid crystal lens units 3010; therefore, the adjustable range of the focal length of the liquid crystal lens can be further increased. For example, as illustrated in FIG. 4C, one of the plurality of electrode strips 110 is correspondingly located at an adjacent position 30100 of a first liquid crystal lens unit 30101 and a second liquid crystal lens unit 30102, in a direction perpendicular to the first substrate 10, the first electrode strip 1100 and the first liquid crystal lens unit 30101 have a first overlapped portion 131, and the first electrode strip 1100 and the second liquid crystal lens unit 30102 have a second overlapped portion 132.

According to the liquid crystal lens provided by an embodiment of the present disclosure, the liquid crystal lens unit 3010 may be configured to have a curvature to be increased upon an electric filed being formed between the first electrode 11 and the second electrode 21, so as to reduce the focal length of the liquid crystal lens.

The liquid crystal molecule has dielectric anisotropy. If $\varepsilon_\parallel$ and $\varepsilon_\perp$ respectively refers to dielectric constants of the liquid crystal molecule in a long axis direction and a short axis direction, the anisotropy can be referred by $\Delta\varepsilon=\varepsilon_\parallel-\varepsilon_\perp$. If $\Delta\varepsilon$ is greater than zero, it refers to that the liquid crystal molecule is positive liquid crystal molecule, and if $\Delta\varepsilon$ is less than zero, it refers to that the liquid crystal molecule is negative liquid crystal molecule. In an electric field, the long axis of the positive liquid crystal molecule is aligned parallel with the direction of the electric field, and the long axis of the negative liquid crystal molecule is aligned perpendicular to the direction of the electric field. In the embodiment of the present disclosure, $n_\parallel$ refers to a refractive index of the liquid crystal molecule parallel with the long axis direction of the liquid crystal molecule, and $n_\perp$ refers to a refractive index of the liquid crystal molecule perpendicular to the long axis direction of the liquid crystal molecule, and $\Delta n=n_\parallel-n_\perp$, if $\Delta n$ is greater than zero, it refers to that the liquid crystal molecule is a uniaxial positive crystal, and if $\Delta n$ is less than zero, it refers to that the liquid crystal molecule is a uniaxial negative crystal.

The liquid crystal layer adopted by the embodiments of the present disclosure may be a negative liquid crystal material with a high refractive index difference, and liquid crystal lenses with different effects can be achieved by matching different refractive indexes of the liquid crystal and filler liquid. For example, in the case where the liquid crystal molecule is a uniaxial positive crystal, a value of $n_\parallel-n_\perp$ is greater than or equal to 0.2. For further example, a value of $n_\parallel-n_\perp$ is greater than or equal to 0.3.

Figure 5A:
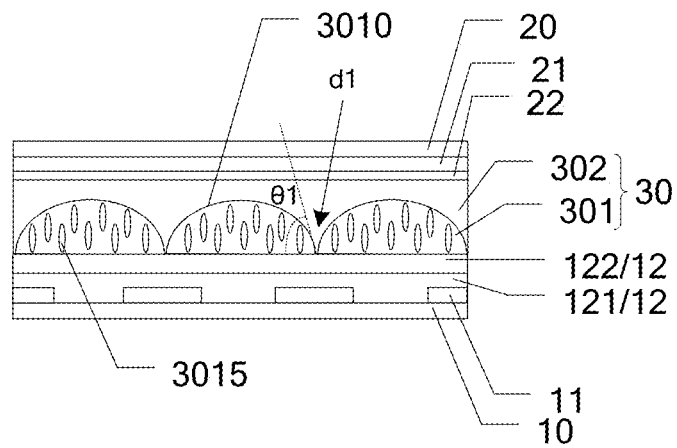
FIG. 5A is a schematic view of an arrangement of liquid crystal molecules in a liquid crystal layer in a case where no electric field is formed between the first electrode and the second electrode in a liquid crystal lens provided by an embodiment of the present disclosure.
Figure 5B:
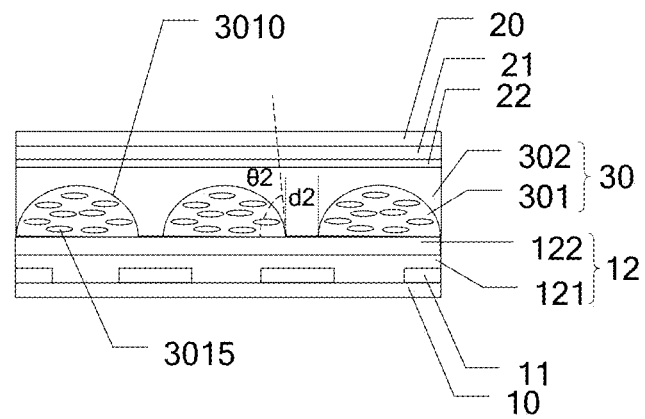
FIG. 5B is a schematic view of an arrangement of liquid crystal molecules in a liquid crystal layer upon forming an electric field between the first electrode and the second electrode in a liquid crystal lens provided by an embodiment of the present disclosure.

For example, as illustrated in FIG. 5A, in order to increase the response time of the liquid crystal molecule, the liquid crystal molecules 3015 can be vertically aligned in a case where no voltage is applied, i.e., an initial pre-tilt angle is 90 degrees or approximately 90 degrees, i.e., the long axis direction of the liquid crystal molecules 3015 is perpendicular, or approximately perpendicular to the first substrate 10 and/or the second substrate 20. As illustrated in FIG. 5B, upon an electric field (a vertical electric field) being formed between the first electrode 11 and the second electrode 21, the long axis direction of the liquid crystal molecules 3015 is approximately parallel with the first substrate 10 and/or the second substrate 20. The conversion of positive and negative lenses can be achieved in some embodiments. Compared with a liquid crystal lens implemented by simply driving the liquid crystal to rotate, this method can increase the adjustable range of the focal length of the liquid crystal lens due to the electrowetting effect.

Hereafter, in the case where the liquid crystal is a negative liquid crystal material having a high refractive index difference is taken as an example, in the case where a negative liquid crystal material is adopted, and an initial pre-tilt angle of liquid crystal molecules is 90 degrees or approximately 90 degrees, upon an electric field (for example, a vertical electric field) being formed between the first electrode 11 and the second electrode, a refractive index of the liquid crystal layer 301 is increased as compared with the case where no electric field is formed. Three different cases are illustrated in terms of the relationship between the refractive index of the liquid crystal layer 301 and the refractive index of the filler layer 302 in a case where no electric field is formed between the first electrode 11 and the second electrode 21.

Figure 6A:
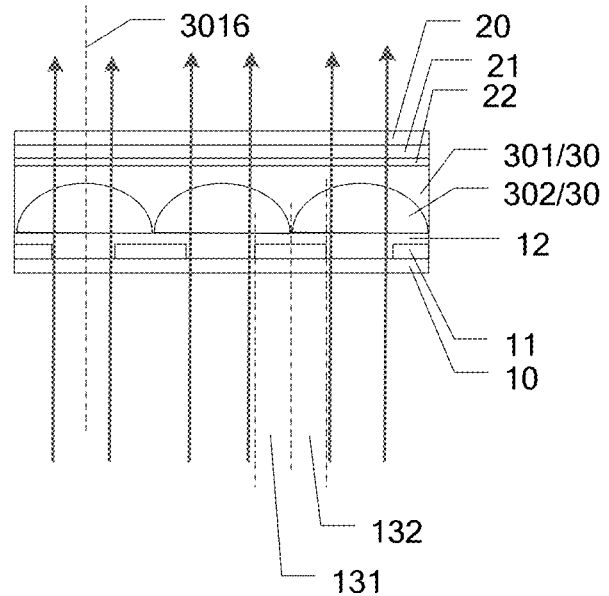
FIG. 6A is a schematic diagram of a light path in a case where no electric field is formed between the first electrode and the second electrode in a liquid crystal lens provided by an embodiment of the present disclosure.
Figure 6B:
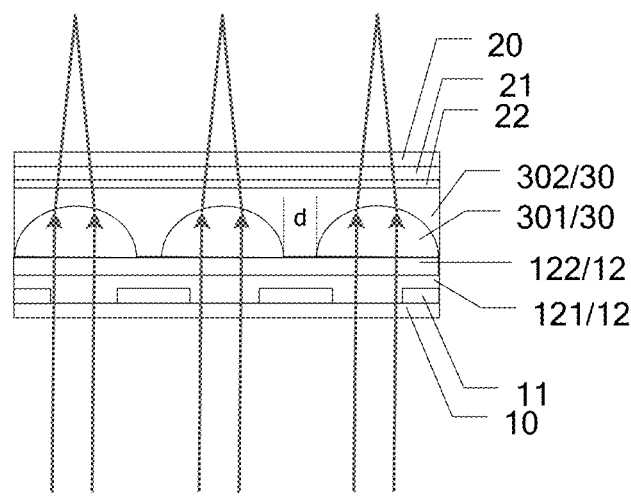
FIG. 6B is a schematic diagram of a light path upon forming an electric field between the first electrode and the second electrode in a liquid crystal lens provided by an embodiment of the present disclosure.

Here is the first case. According to the liquid crystal lens provided by an embodiment of the present disclosure, for example, as illustrated in FIG. 6A, in a case where no electric field is formed between the first electrode 11 and the second electrode 21, the liquid crystal layer 301 has the same refractive index as the filler layer 302, therefore, upon light passing through the liquid crystal layer 301, the emitted light is not deflected, and the focal length of the liquid crystal lens unit 3010 is at infinity. As illustrated in FIG. 6B, upon an electric filed being formed between the first electrode 11 and the second electrode 21, the liquid crystal molecules of the liquid crystal layer are rotated, and the liquid crystal molecules change from a direction perpendicular to the two substrates to a direction parallel with the two substrates. Because the refractive index of the negative liquid crystal molecule in the long axis direction is larger than the refractive index of the negative liquid crystal molecule in the short axis direction, the refractive index of the liquid crystal layer 30 is increased, the refractive index of the liquid crystal layer 30 is greater than the refractive index of the filler layer 302, and light incident on the liquid crystal lens unit 3010 is refracted on a surface of the liquid crystal lens unit 3010, the emitted light is deflected toward a direction close to a center line 3016 of the liquid crystal lens unit 3010 compared to the case there is no electric field, so that the focal length of the liquid crystal lens is decreased. Moreover, under an action of electrowetting, a distance d between adjacent liquid crystal lens units 3010 is increased, and the shape of the liquid crystal lens unit 3010 is changed, so that the focal length of the liquid crystal lens is further reduced. Under the dual actions of the changes in the refractive index and shape of the liquid crystal layer 301, the focal length is reduced in a large range.

Figure 7A:
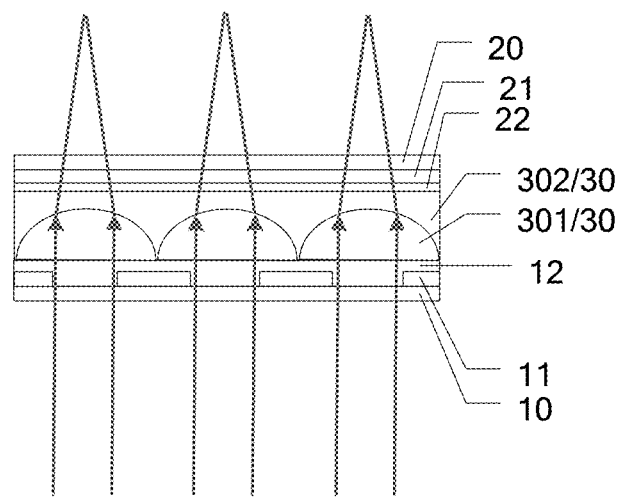
FIG. 7A is a schematic diagram of a light path in a case where no electric field is formed between the first electrode and the second electrode in a liquid crystal lens provided by another embodiment of the present disclosure.
Figure 7B:
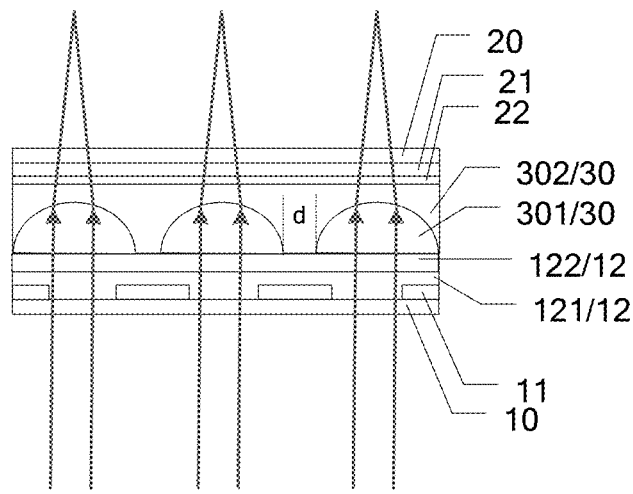
FIG. 7B is a schematic diagram of a light path upon forming an electric field between the first electrode and the second electrode in a liquid crystal lens provided by another embodiment of the present disclosure.

Here is the second case. According to the liquid crystal lens provided by an embodiment of the present disclosure, for example, as illustrated in FIG. 7A, in a case where no electric field is formed between the first electrode 11 and the second electrode 21, the refractive index of the liquid crystal layer 301 is greater than that of the filler layer 302; therefore, upon light passing through the liquid crystal layer 301, the emitted light is deflected toward a direction close to a center line of the liquid crystal lens unit 3010. As illustrated in FIG. 7B, the refractive index of the liquid crystal layer 30 is increased upon forming an electric field between the first electrode 11 and the second electrode 21, because the refractive index of the liquid crystal layer 301 is increased, the refractive index of the liquid crystal layer 301 is still larger than that of the filler layer 302, light incident on the liquid crystal lens unit 3010 is emitted at a boundary of the liquid crystal lens unit, and the emitted light is deflected toward a direction closer to the center line 3016 of the liquid crystal lens unit 3010 than the case where there is no electric field (compared with the case where no electric field is formed, the refraction angle is increased in the case where an electric field is formed). Because the shape of the liquid crystal lens unit 3010 is changed, the focal length of the liquid crystal lens is further reduced. Under the dual actions of the changes in the refractive index and shape of the liquid crystal layer 301, the focal length is reduced in a large range. The equivalent effect of the liquid crystal lens is a convex lens although the voltage value of the driving signal applied to the first electrode 11 is adjusted, and the focal length of the liquid crystal lens is adjustable. Furthermore, as the voltage value of the drive signal applied to the first electrode 11 is increased, the focal length of the liquid crystal lens unit is decreased.

Figure 8A:
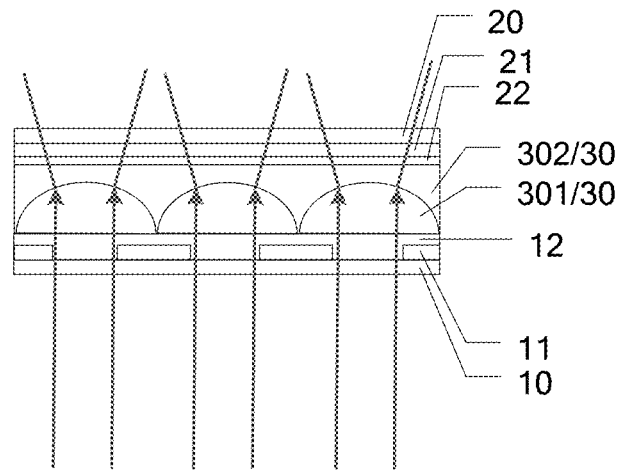
FIG. 8A is a schematic diagram of a light path in a case where no electric field is formed between the first electrode and the second electrode in a liquid crystal lens provided by another embodiment of the present disclosure.
Figure 8B:
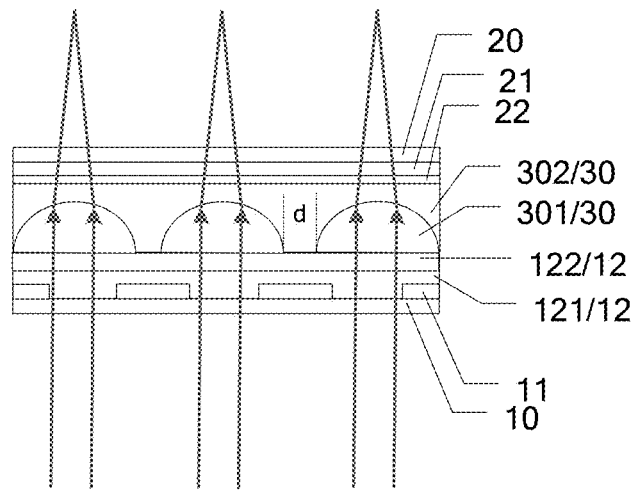
FIG. 8B is a schematic diagram of a light path upon forming an electric field between the first electrode and the second electrode in a liquid crystal lens provided by another embodiment of the present disclosure.

Here is the third case. According to the liquid crystal lens provided by an embodiment of the present disclosure, for example, as illustrated in FIG. 8A, the refractive index of the liquid crystal layer 301 is less than that of the filler layer 302 in a case where no electric field is formed between the first electrode 11 and the second electrode 21; therefore, upon light passing through the liquid crystal layer 301, the emitted light is deflected to a direction away from a center line 3016 of the liquid crystal lens unit 3010, and the liquid crystal layer 301 is a negative lens. As illustrated in FIG. 8B, the refractive index of the liquid crystal layer 30 is increased upon forming an electric field between the first electrode 11 and the second electrode 21, and the refractive index of the liquid crystal layer 30 can gradually be increased to be equal to the refractive index of the filler layer 302 (in this case, the light emitted from the liquid crystal lens unit 3010 is not deflected, similarly to parallel plates), and then increased to be larger than the refractive index of the filler layer 302. In the case where the refractive index of the liquid crystal layer 30 is greater than the refractive index of the filler layer 302, the light incident on the liquid crystal lens unit 3010 is emitted at a boundary of the liquid crystal lens unit, and the emitted light is deflected toward a direction close to the center line of the liquid crystal lens unit 3010 to form a positive lens. The shape of the liquid crystal lens unit 3010 is changed, so that the focal length of the liquid crystal lens is further reduced. Under the dual actions of the changes in the refractive index and shape of the liquid crystal layer 301, the focal length is reduced in a large range. The voltage value of the driving signal applied to the first electrode 11 is adjusted, and the equivalent effect of the liquid crystal lens turns from a concave lens to parallel plates, and then to a convex lens.

The above-mentioned three cases can be achieved by changing models of the liquid crystal and types of the filler liquid. The above-mentioned three cases can be selected according to actual needs. By using this technique, a focal length change in a large size lens and an array substrate of micro lenses can be realized by changing the manufacturing size of the embodiments.

It should be explained that: in the embodiments of the present disclosure, it is not limited to adopt a negative liquid crystal molecule with uniaxial positive crystal. For example, a positive liquid crystal molecule of uniaxial negative crystal can also be adopted, in this case, the long axis of the liquid crystal molecule is parallel with or approximately parallel with the first substrate 10 upon no electric filed being formed between the first electrode 11 and the second electrode 21 or in an initial state, the long axis of the liquid crystal molecule is arranged in parallel or approximately parallel with a direction of the electric field upon forming an electric field between the first electrode 11 and the second electrode 12, at this moment, the long axis of the liquid crystal molecule is perpendicular or approximately perpendicular to the first substrate 10. In this case, because $n_\perp$ is greater than $n_\parallel$, the refractive index of the liquid crystal layer is increased upon forming an electric field between the first electrode 11 and the second electrode 21.

Figure 9A:
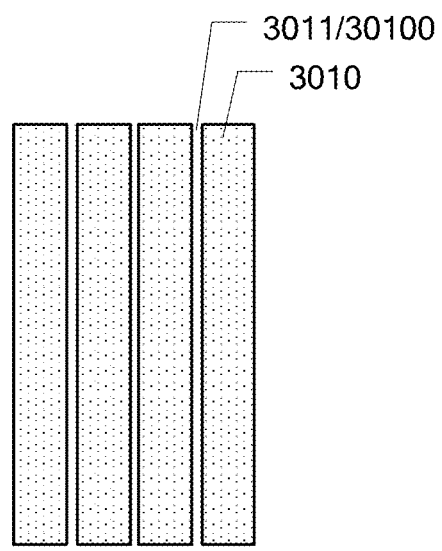
FIG. 9A is a top view of liquid crystal lens units of a liquid crystal layer in a liquid crystal lens provided by another embodiment of the present disclosure.
Figure 9B:
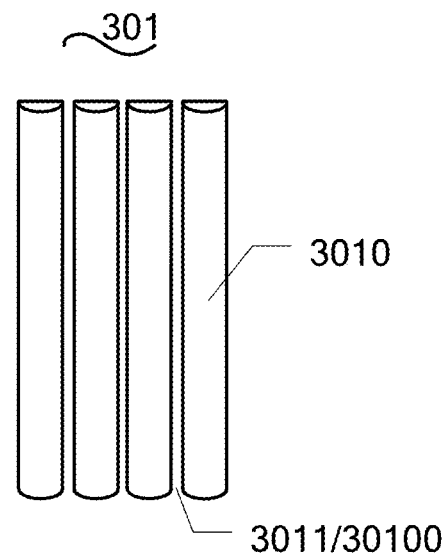
FIG. 9B is a schematic perspective view of liquid crystal lens units of a liquid crystal layer in a liquid crystal lens provided by another embodiment of the present disclosure.

According to the liquid crystal lens provided by the present embodiment, for example, as illustrated in FIG. 9A, an interval 3011 is provided between two adjacent liquid crystal lens units 3010, and the interval 3011 is filled with the filler layer 302. For example, a position of the interval 3011 is an adjacent position 30100 of the two adjacent liquid crystal lens units 3010. FIG. 9B illustrates a schematic perspective view of the liquid crystal lens units 3010 in the case where two adjacent liquid crystal lens units 3010 have an interval 3011 therebetween. For example, a structure of the liquid crystal lens units 3010 in an initial state (in a case where no electric field is formed between the first electrode 11 and the second electrode 21) is illustrated in FIG. 9A and FIG. 9B. That is, in a case where no electric field is formed between the first electrode 11 and the second electrode 21, a distance between two adjacent liquid crystal lens units 3010 is greater than 0. For example, in a case where no electric field is formed between the first electrode 11 and the second electrode 21, the distance between two adjacent liquid crystal lens units 3010 is in a range from a quarter to a half of a width of an electrode strip. Compared with the case where no electric field is formed between the first electrode 11 and the second electrode 21, the interval 3011 is increased upon forming an electric field between the first electrode 11 and the second electrode 21. For example, the liquid layer 30 is configured to adjust the distance d between two adjacent liquid crystal units 3010 under the action of the electric field.

For example, in a case where no electric field is formed between the first electrode 11 and the second electrode 21, the liquid crystal lens units 3010 have the same size and the same shape. For example, upon forming an electric field between the first electrode 11 and the second electrode 21, the liquid crystal lens units 3010 have the same size and the same shape.

Figure 10:
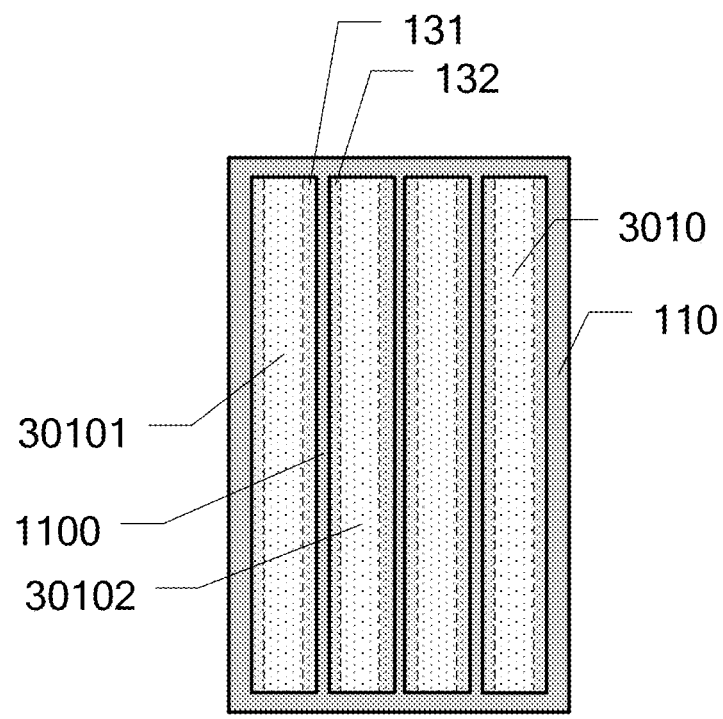
FIG. 10 is a top view of a first electrode and liquid crystal lens units of a liquid crystal layer in a liquid crystal lens provided by another embodiment of the present disclosure.

According to the liquid crystal lens provided by the present embodiment, for example, as illustrated in FIG. 10, one first electrode strip 1100 in the plurality of electrode strips 110 is correspondingly located at an adjacent position of a first liquid crystal lens unit 30101 and a second liquid crystal unit 30102. In a direction perpendicular to the first substrate 10, the first electrode strip 1100 and the first liquid crystal lens unit 30101 have a first overlapped portion 131, and the first electrode strip 1100 and the second liquid crystal lens unit 30102 have a second overlapped portion 132.

Figure 11A:
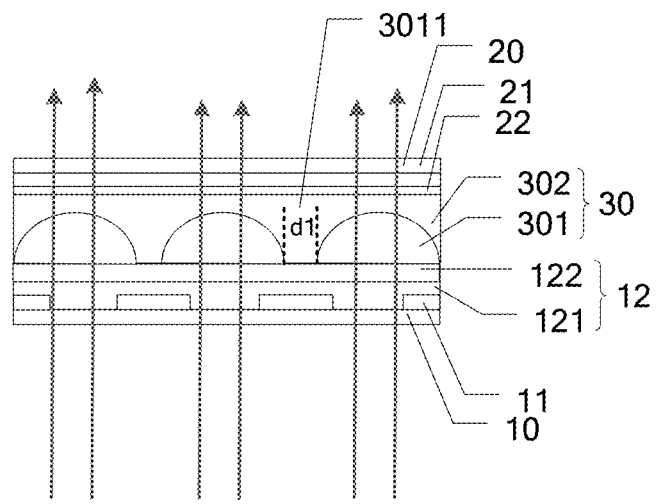
FIG. 11A is a schematic diagram illustrating an interval provided between two adjacent liquid crystal lens units in a case where no electric field is formed between the first electrode and the second electrode, and a light path, of a liquid crystal lens provided by another embodiment of the present disclosure.
Figure 11B:
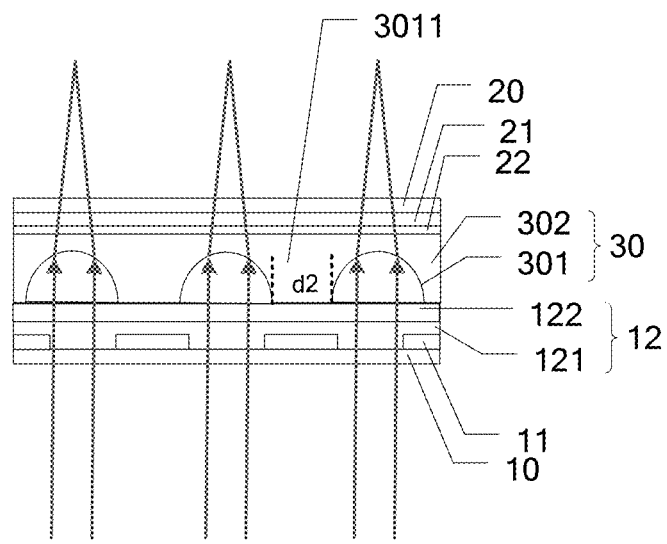
FIG. 11B is a schematic diagram illustrating an interval provided between two adjacent liquid crystal lens units upon forming an electric field between the first electrode and the second electrode, and a light path, of a liquid crystal lens provided by another embodiment of the present disclosure.

For example, as illustrated in FIG. 11A and FIG. 11B, upon forming an electric field between the first electrode 11 and the second electrode 21, the interval 3011 between two adjacent liquid crystal lens units 3010 is increased. FIG. 11A and FIG. 11B are described by taking a case where the refractive index of the liquid crystal layer 301 and the refractive index of the filler layer 302 are the same in a case where no electric field is formed between the first electrode 11 and the second electrode 21. It should be noted that the refractive index of the liquid crystal layer 301 and the refractive index of the filler layer 302 can be different in a case where no electric field is formed between the first electrode 11 and the second electrode 21, which can be referred to the three cases of the relationship between the refractive index of the liquid crystal layer 301 and the refractive index of the filler layer 302, and the details are omitted herein.

At least one embodiment of the present disclosure further provides a manufacturing method of a liquid crystal lens, which includes:

forming a liquid crystal layer 301 on the first substrate 10;

forming a filler layer 302 on the liquid crystal layer 301; and cell-assembling the first substrate 10 and the second substrate 20;

wherein the liquid crystal layer 301 includes a plurality of liquid crystal lens units 3010, the plurality of liquid crystal lens units 3010 are in contact with the first substrate 10, and the filler layer 302 is filled in a space between the first substrate 10 and the second substrate 20 except the liquid crystal layer 301; and the liquid crystal layer 301 is made of a material different from the filler layer 302.

For example, the method further includes forming a first electrode 11 on the first substrate 10, and forming a second electrode 21 on the first substrate 10 or the second substrate 20. The first electrode 11 and the second electrode 21 are configured to form an electric field to drive the liquid crystal molecules of the liquid crystal layer 301 to rotate, and the first electrode 11 and the second electrode 21 are further configured to adjust curvatures of the liquid crystal lens units 3010.

For example, with regard to forming the liquid crystal layer 301 on the first substrate 10 with the first electrode 11 formed thereon, a suitable method can be selected according to the requirements. For example, one liquid crystal lens unit 3010 can be formed at every time, thereby forming a plurality of liquid crystal lens units 3010 in sequence. A plurality of liquid crystal lens units 3010 can also be formed in one time. The embodiments of the present disclosure are not limited thereto. For example, the liquid crystal layer 301 can be formed through a one drop filling (ODF) method, which is similar to a spray coating method. For example, upon dropping liquid crystal droplets, forming each of the liquid crystal lens units with a strip shaped and having an arch shape by merging adjacent liquid crystal droplets in a first direction together due to a small interval provided between the adjacent liquid crystal droplets in the first direction; forming the plurality of the liquid crystal lens units arranged in a sequence by keeping adjacent liquid crystal droplets in a second direction not in contact with each other and independent from each other due to a large interval provided between the adjacent liquid crystal droplets in the second direction. For example, the first direction is perpendicular to the second direction. The first direction and the second direction are directions parallel with the first substrate 10. For example, the first direction is an extension direction of the liquid crystal lens units 3010.

According to the manufacturing method of a liquid crystal lens provided by an embodiment of the present disclosure, the first substrate 10 and the second substrate 20 can be cell-assembled after the filler layer 302 is formed, and the filler layer 302 can be formed by filling liquid after the first substrate 10 formed with the first electrode 11 and the liquid crystal layer 301 is cell-assembled with the second substrate 20. The method of firstly forming the filler layer and then cell-assembling the first substrate 10 and the second substrate 20 is advantageous to the formation of the initial morphology of the liquid crystal lens units.

According to the manufacturing method of the liquid crystal lens provided by an embodiment of the present disclosure, an interval 3011 is provided between two adjacent liquid crystal lens units 3010, and the interval 3011 is filled with the filler layer 302. As a result, a liquid crystal lens in which two adjacent liquid crystal lens units 3010 have an interval 3011 therebetween in an initial state (a case no voltage is applied) can be formed. After an electric field is formed between the first electrode 11 and the second electrode 21, the interval 3011 is increased.

According to the manufacturing method of a liquid crystal lens provided by an embodiment of the present disclosure, an arch height of each of the liquid crystal lens units 3010 is less than a cell thickness of the liquid crystal lens.

According to the manufacturing method of a liquid crystal lens provided by an embodiment of the present disclosure, the liquid crystal layer 301 has the same density as the filler layer 302.

According to the manufacturing method of a liquid crystal lens provided by an embodiment of the present disclosure, the first electrode 11 includes a plurality of electrode strips 110, the plurality of electrode strips 110 are arranged in parallel. The plurality of liquid crystal lens units 3010 are arranged in parallel, and each of the electrode strips 110 has the same extending direction as each of the liquid crystal lens units 3010.

According to the manufacturing method of a liquid crystal lens provided by an embodiment of the present disclosure, each electrode strip 110 is formed at an adjacent position 30100 corresponding to two adjacent liquid crystal lens units 3010. In a direction perpendicular to the first substrate 10, each electrode strip 110 is partially overlapped with the two adjacent liquid crystal lens units 3010 corresponding to the electrode strip 110. That is to say, an orthographic projection of each electrode strip 110 on the first substrate 10 has an overlapped portion with an orthographic projection of the two adjacent liquid crystal lens units 3010 corresponding to the electrode strip 110 on the first substrate 10.

According to the manufacturing method of a liquid crystal lens provided by an embodiment of the present disclosure, the plurality of electrode strips 110 are electrically connected together, but are not limited thereto.

According to the manufacturing method of a liquid crystal lens provided by an embodiment of the present disclosure, the method further includes: forming an insulation layer 121 on the first electrode 11, and forming a hydrophobic layer 122 on the insulation layer 121. At least the liquid crystal layer 301 is in contact with the hydrophobic layer 122.

Figure 12:
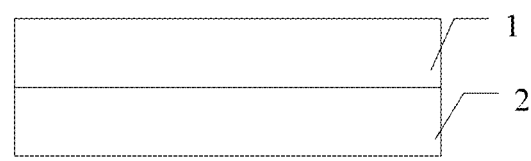
FIG. 12 is a schematic view of a display device provided by an embodiment of the present disclosure.

At least one embodiment of the present disclosure further provides a display device, as illustrated in FIG. 12, the display device includes the liquid crystal lens 1 described in any one of the above-mentioned embodiments. For example, the display device can further include a display panel 2.

Figure 13:
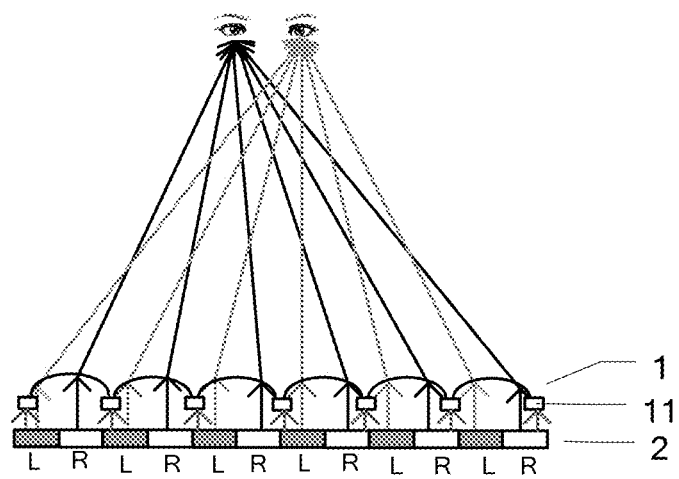
FIG. 13 is a schematic view of 3D display of a display device provided by an embodiment of the present disclosure.

For example, as illustrated in FIG. 13, the display panel 2 can include a left-eye pixel L and a right-eye pixel R. After light passes through the liquid crystal lens 1, a 3D display effect can be achieved. For example, in a case where the liquid crystal lens provided by an embodiment of the present disclosure is applied to a lens type 3D display, a light shielding layer 011 is covered on the first electrode 11 located at an adjacent position of two adjacent liquid crystal lens units, or the first electrode adopts a metal electrode, then the backlight cannot pass through, light cannot pass through the adjacent position of two adjacent liquid crystal lens units, thus the light crosstalk at the adjacent position of two adjacent liquid crystal lens units can be reduced, so as to reduce the crosstalk value of the 3D display device.

The following points should to be explained:

(1) The light path diagrams provided by the embodiments of the present disclosure are generally schematic diagrams for ease of being understood, and actual light may be slightly different from the illustration.

(2) The methods provided by the embodiments of the present disclosure can be used to manufacture any one of the liquid crystal lenses provided by the embodiments of the present disclosure. The manufacturing method of the liquid crystal lens is briefly described, and the same or similar points can be found in the description of the liquid crystal lens.

(3) Unless otherwise defined, in the embodiments and accompanying drawings in the present disclosure, the same reference numeral refers to the same meaning.

(4) The accompanying drawings involve only the structure(s) in connection with the embodiment(s) of the present disclosure, and other structure(s) can be referred to common design(s).

(5) For the purpose of clarity, in accompanying drawings for illustrating the embodiment(s) of the present disclosure, layer(s) or region(s) may be enlarged. However, it should understood that, in the case in which a component or element such as a layer, film, region, substrate or the like is referred to be "on" or "under" another component or element, it may be directly on or under the another component or element or a component or element is interposed therebetween.

(6) In the case of no conflict, the features of the same embodiment and the features in different embodiments of the present disclosure can be combined with each other.

What have been described above are only specific implementations of the present disclosure, the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims.

What is claimed is:

1. A liquid crystal lens, comprising: a first substrate, a second substrate and a liquid layer located between the first substrate and the second substrate, wherein the liquid layer comprises a liquid crystal layer and a filler layer, the liquid crystal layer comprises a plurality of liquid crystal lens units, the plurality of liquid crystal lens units are located on the first substrate, the filler layer is filled in a space between the first substrate and the second substrate except the liquid crystal layer; and the liquid crystal layer is made of a material different from the filler layer, wherein the liquid crystal lens further comprises a first electrode and a second electrode, the first electrode and the second electrode are configured to form an electric field to drive liquid crystal molecules of the liquid crystal layer to rotate, and the first electrode and the second electrode are further configured to adjust a curvature of each of the liquid crystal lens units, and wherein an interval is provided between two adjacent liquid crystal lens units, the interval is filled with the filler layer.

2. The liquid crystal lens according to claim 1, wherein the liquid layer is configured to adjust a dimension of the interval between the two adjacent liquid crystal lens units under an action of the electric field.

3. The liquid crystal lens according to claim 1, wherein an arch height of each of the liquid crystal lens units is less than a cell thickness of the liquid crystal lens.

4. The liquid crystal lens according to claim 1, wherein the liquid crystal layer has a same density as the filler layer.

5. The liquid crystal lens according to claim 1, herein a filler liquid of the filler layer comprises a saline solution.

6. The liquid crystal lens according to claim 1, wherein the first electrode is located on the first substrate, and the second electrode is located on the second substrate.

7. The liquid crystal lens according to claim 1, wherein the first electrode comprises a plurality of electrode strips, the plurality of electrode strips are arranged in parallel, the plurality of liquid crystal lens units are arranged in parallel, each of the plurality of electrode strips has a same extension direction as each of the liquid crystal lens units.

8. The liquid crystal lens according to claim 1, further comprising a hydrophobic layer, wherein the hydrophobic layer is located between the liquid layer and the first substrate, at least the liquid crystal layer in the liquid layer is in contact with the hydrophobic layer.

9. The liquid crystal lens according to claim 1, wherein each of the liquid crystal lens units is configured to have a curvature to be increased upon forming an electric field between the first electrode and the second electrode.

10. The liquid crystal lens according to claim 1, wherein the liquid crystal layer comprises a negative liquid crystal material, liquid crystal molecules in the liquid crystal layer are vertically aligned in a case where no electric filed is formed.

11. The liquid crystal lens according to claim 1, wherein, relative to a case where no electric field is formed between the first electrode and the second electrode, a refractive index of the liquid crystal layer is increased upon forming an electric field between the first electrode and the second electrode.

12. A display device, comprising the liquid crystal lens according to claim 1.

13. A manufacturing method of a liquid crystal lens, comprising: forming a liquid crystal layer on a first substrate; forming a filler layer on the liquid crystal layer; and cell-assembling the first substrate with a second substrate, wherein the liquid crystal layer comprises a plurality of liquid crystal units, the plurality of liquid crystal units are in contact with the first substrate, the filler layer is filled in a space between the first substrate and the second substrate except the liquid crystal layer; and the liquid crystal layer is made of a material different from the filler layer, forming the liquid crystal layer by a dropping method, wherein forming the liquid crystal layer by the dropping method comprises: upon dropping liquid crystal droplets, forming each of the liquid crystal lens units with a strip shape and having an arch shape by merging adjacent liquid crystal droplets in a first direction together due to a small interval provided between the adjacent liquid crystal droplets in the first direction; forming the plurality of the liquid crystal lens units arranged in a sequence by keeping adjacent liquid crystal droplets in a second direction not in contact with each other and independent from each other due to a large interval provided between the adjacent liquid crystal droplets in the second direction; the first direction being perpendicular to the second direction.

14. The manufacturing method of the liquid crystal lens according to claim 13, further comprising:
    forming a first electrode on the first substrate; and
    forming a second electrode on the first substrate or the second substrate;

wherein the first electrode and the second electrode are configured to form an electric field to drive liquid crystal molecules of the liquid crystal layer to rotate, and the first electrode and the second electrode are further configured to adjust a curvature of each of the liquid crystal lens units.

15. The manufacturing method of the liquid crystal lens according to claim 13, further comprising: forming an insulation layer on the first substrate, and forming a hydrophobic layer on the insulation layer, wherein at least the liquid crystal layer selected from the group consisting of the filler layer and the liquid crystal layer is in contact with the hydrophobic layer.

16. A liquid crystal lens, comprising: a first substrate, a second substrate and a liquid layer located between the first substrate and the second substrate, wherein the liquid layer comprises a liquid crystal layer and a filler layer, the liquid crystal layer comprises a plurality of liquid crystal lens units, the plurality of liquid crystal lens units are located on the first substrate, the filler layer is filled in a space between the first substrate and the second substrate except the liquid crystal layer; and the liquid crystal layer is made of a material different from the filler layer, wherein the liquid crystal lens further comprises a first electrode and a second electrode, the first electrode and the second electrode are configured to form an electric field to drive liquid crystal molecules of the liquid crystal layer to rotate, and the first electrode and the second electrode are further configured to adjust a curvature of each of the liquid crystal lens units, wherein the first electrode comprises a plurality of electrode strips, the plurality of electrode strips are arranged in parallel, the plurality of liquid crystal lens units are arranged in parallel, each of the plurality of electrode strips has a same extension direction as each of the liquid crystal lens units, and wherein each of the electrode strips is located at an adjacent position of two adjacent liquid crystal lens units, in a direction perpendicular to the first substrate, an orthographic projection of each of the electrode strips on the first substrate has an overlapped portion with an orthographic projection of two adjacent liquid crystal lens units corresponding to the electrode strip on the first substrate.

* * * * *